United States Patent
Huang et al.

(10) Patent No.: US 7,441,922 B2
(45) Date of Patent: Oct. 28, 2008

(54) LED LAMP TUBE

(75) Inventors: Ming-Chung Huang, Taipei (TW);
Yu-Yang Liu, Taipei (TW); Fu-Hsung Ou, Taipei (TW); Ying-Hsuan Chen, Taipei (TW)

(73) Assignee: Ledtech Electronics Corp., Hsindian (TW)

( * ) Notice: Subject to any disclaimer, the term of this patent is extended or adjusted under 35 U.S.C. 154(b) by 0 days.

(21) Appl. No.: 11/306,041

(22) Filed: Dec. 14, 2005

(65) Prior Publication Data

US 2007/0133202 A1 Jun. 14, 2007

(51) Int. Cl.
*F21V 21/26* (2006.01)
(52) U.S. Cl. .................. 362/235; 362/249; 362/225; 362/418; 362/282; 362/287; 362/800

(58) Field of Classification Search .................. 362/235, 362/225, 249, 219, 220, 277, 282, 287, 418; 248/201
See application file for complete search history.

(56) References Cited

U.S. PATENT DOCUMENTS

| | | | | |
|---|---|---|---|---|
| 5,463,280 A | * | 10/1995 | Johnson | 315/187 |
| 5,688,042 A | * | 11/1997 | Madadi et al. | 362/240 |
| 6,283,612 B1 | * | 9/2001 | Hunter | 362/240 |
| 6,997,576 B1 | * | 2/2006 | Lodhie et al. | 362/240 |
| 2006/0126325 A1 | * | 6/2006 | Lefebvre et al. | 362/217 |

* cited by examiner

*Primary Examiner*—Sharon E Payne
(74) *Attorney, Agent, or Firm*—Rosenberg, Klein & Lee

(57) ABSTRACT

A LED lamp tube is disclosed to include a tube that admits light, circuit boards respectively mounted inside the tube, each circuit board carrying an array of LEDs, two end caps respectively capped on the ends of the tube to hold the circuit boards inside the tube and connectable to connectors of a conventional fluorescent bulb holder to secure the tube to the conventional fluorescent bulb holder, and a power cord extending from the circuit boards out of the tube for connection to power supply to obtain the necessary working voltage for the LEDs.

5 Claims, 8 Drawing Sheets

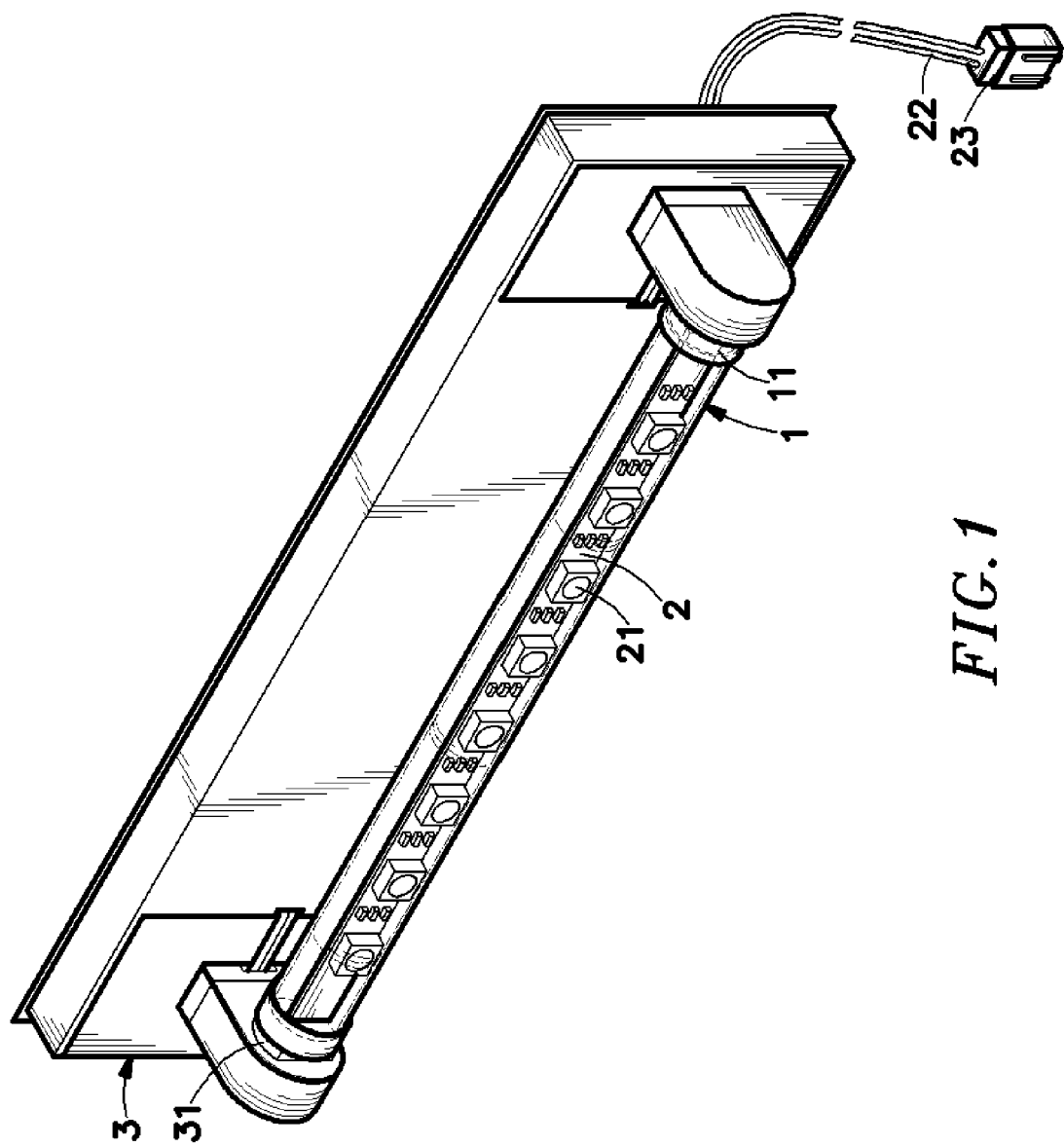

LED LAMP TUBE

BACKGROUND OF THE INVENTION

1. Field of the Invention

The present invention relates to lamps and more particularly, to a LED lamp tube that can directly be installed in a conventional fluorescent bulb holder to substitute for a conventional fluorescent bulb.

2. Description of the Related Art

The invention of lamp changes the living style of human beings. Without lamp, we cannot work at night or in the dark, and the living standard of human beings will stay in the level of the old time.

Commercial lighting fixtures commonly use fluorescent lamps, incandescent lamps, or the so-called power-saving lamps to give off light for illumination. These lighting fixtures have the common drawbacks of high power consumption, quick light attenuation, short service life, fragile characteristic, and being not reclaimable. Further, during the operation of a fluorescent lamp, electric current passes through the electrodes at a high frequency about 120 times per second, causing sparkling of light that is harmful to the eyes. In order to eliminate this problem, a high-frequency electronic ballast may be used. The use of a high-frequency electronic ballast in a fluorescent lamp saves power consumption and stabilizes the electric current, preventing the problem of sparkling of light. However, the high-frequency electronic ballast of a fluorescent lamp is not detachable. When the fluorescent lamp is damaged, the high-frequency electronic ballast cannot be removed from the fluorescent lamp for a repeat use. Further, because conventional fluorescent lamps have a mercury coating coated on the inside wall of the respective lamp tube, the used fluorescent lamps must be properly disposed of to prevent pollution to the environment.

SUMMARY OF THE INVENTION

"The present invention has been accomplished under the circumstances in view. It is the main object of the present invention to provide a LED lamp tube, which is directly connectable to a conventional fluorescent bulb holder to substitute for a fluorescent bulb. It is another object of the present invention to provide a LED lamp tube, which has the advantages of quick reaction time, small size, low power consumption, low pollution, high brightness, and long service life. To achieve these and other objects of the present invention, the LED lamp tube comprises a tube that admits light, circuit boards respectively mounted inside the tube, each circuit board carrying an array of LEDs, two end caps respectively capped on the ends of the tube that holds the circuit boards inside the tube and connectable to connectors of a conventional fluorescent bulb holder to secure the tube to the conventional fluorescent bulb holder, and a power cord extending from the circuit boards out of the tube for connection to power supply to obtain the necessary working voltage for the LEDs."

BRIEF DESCRIPTION OF THE DRAWINGS

FIG. 1 is a perspective view showing a LED lamp tube installed in a conventional fluorescent bulb holder according to the present invention.

DETAILED DESCRIPTION OF THE PREFERRED EMBODIMENT

Figure 1A:
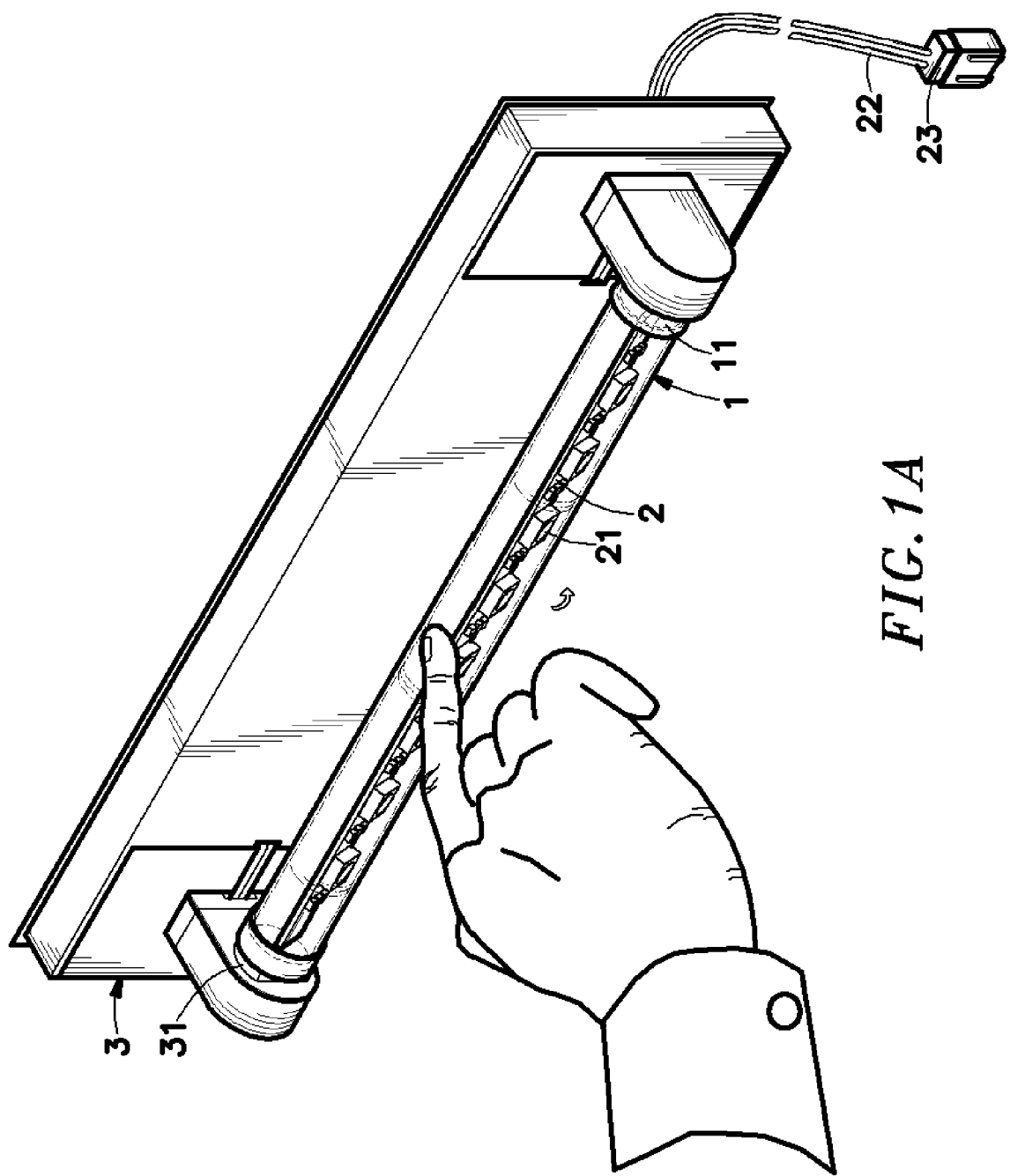
FIG. 1A is a schematic drawing showing the tube of the LED lamp tube rotated relative to the end caps and the fluorescent bulb holder according to the present invention.
Figure 2:
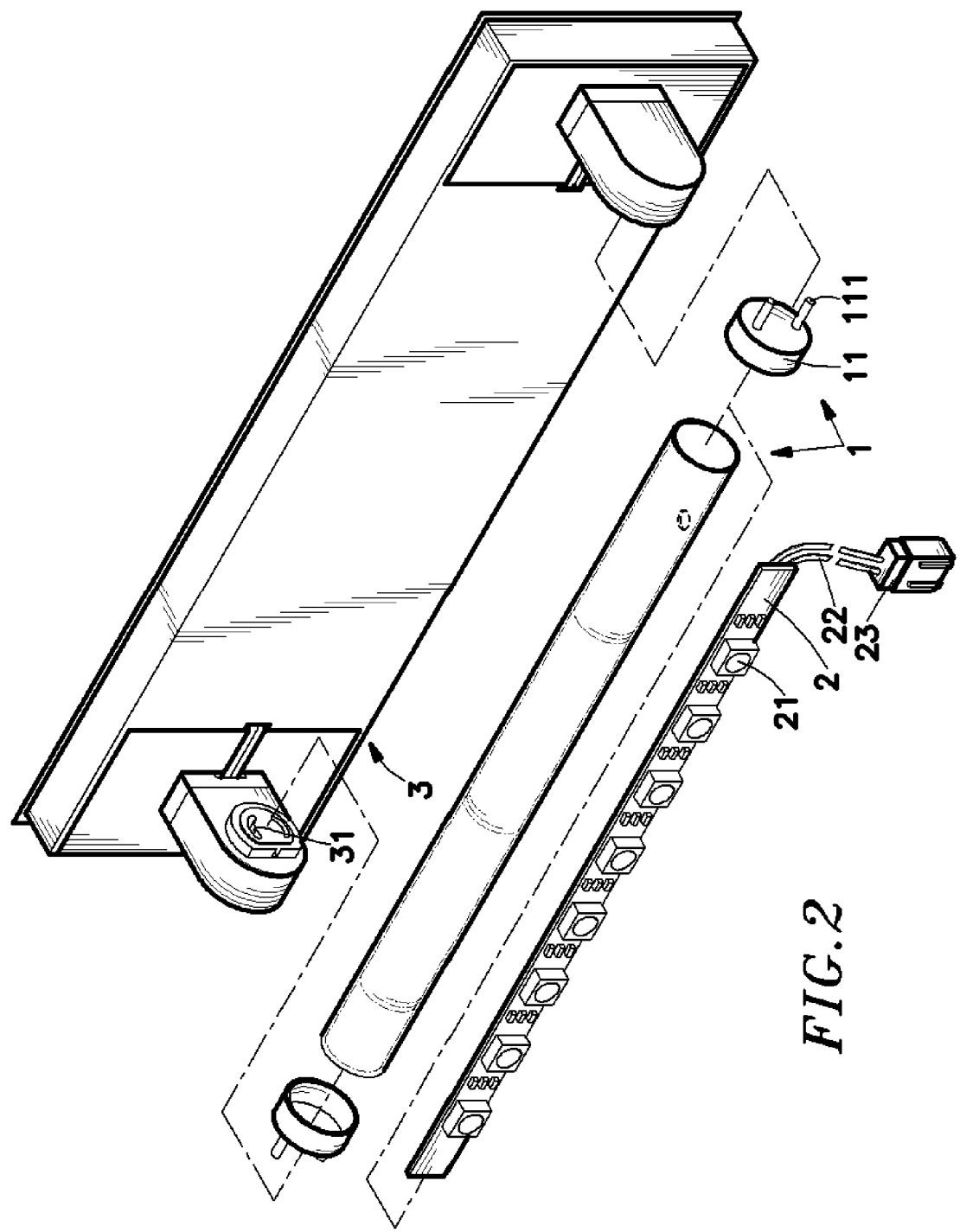
FIG. 2 is an exploded view of the LED lamp tube according to the present invention.

Referring to FIGS. 1 and 2, a LED lamp tube in accordance with the present invention is shown connectable to connectors 31 of a conventional fluorescent bulb holder 3, comprising a tube 1 and a circuit board 2. The tube 1 can be a transparent or translucent tube in any of a variety of colors, i.e., the tube 1 admits light, having two end caps 111 respectively capped on the two distal ends thereof. The end caps 11 each have mounting pins 111 for installation in the connectors 31 of the fluorescent bulb holder 3. The length of the tube 1 fits the pitch between the connectors 31 of the fluorescent bulb holder 3. The circuit board 2 is a narrow elongated having a plurality of LEDs (light emitting diodes) 21 installed in one side thereof and arranged in an array, and a power cord 22 extending out of one end thereof and terminating in an electric plug 23 for connection to power supply.

"The circuit board 2 is mounted in the tube 1. After insertion of the circuit board 2 into the tube 1, the end caps 11 are respectively capped on the two distal ends of the tube 1 to hold the circuit board 2 firmly inside the tube 1, keeping the LEDs 21 suspending inside the tube 1 and the power cord 22 extending out of the tube 1. Thereafter, the mounting pins 111 of the end caps 111 are respectively fastened to the connectors 31 of the fluorescent bulb holder 3 to secure the LED lamp tube to the fluorescent bulb holder 3. After installation of the fluorescent bulb holder 3 in the ceiling, the wall, or any desired location, the electric plug 23 of the power cord 22 is electrically connected to power supply to obtain the necessary working voltage for the LEDs 21, thereby causing the LEDs 21 to emit light. Further, the user can rotate the tube 1 relative to the end caps 11 at the connectors 31 of the fluorescent bulb holder 3 to adjust the light emitting angle of the LEDs 21 in the circuit board 2 inside the tube 1 (see FIG. 1A)."

When one or some of the LEDs 21 failed, the user can detach the LED lamp tube from the fluorescent bulb holder 3, and then open one end cap 11 from the tube 1, and then remove the circuit board 2 out of the tube 1. After replacement of the failed LED(s) 21 with new LED(s), the circuit board 2 is put in the tube 1 again, and then the respective end cap 11 is fastened to the tube 1, and then the LED lamp tube is installed in the fluorescent bulb holder 3 again.

Figure 3:
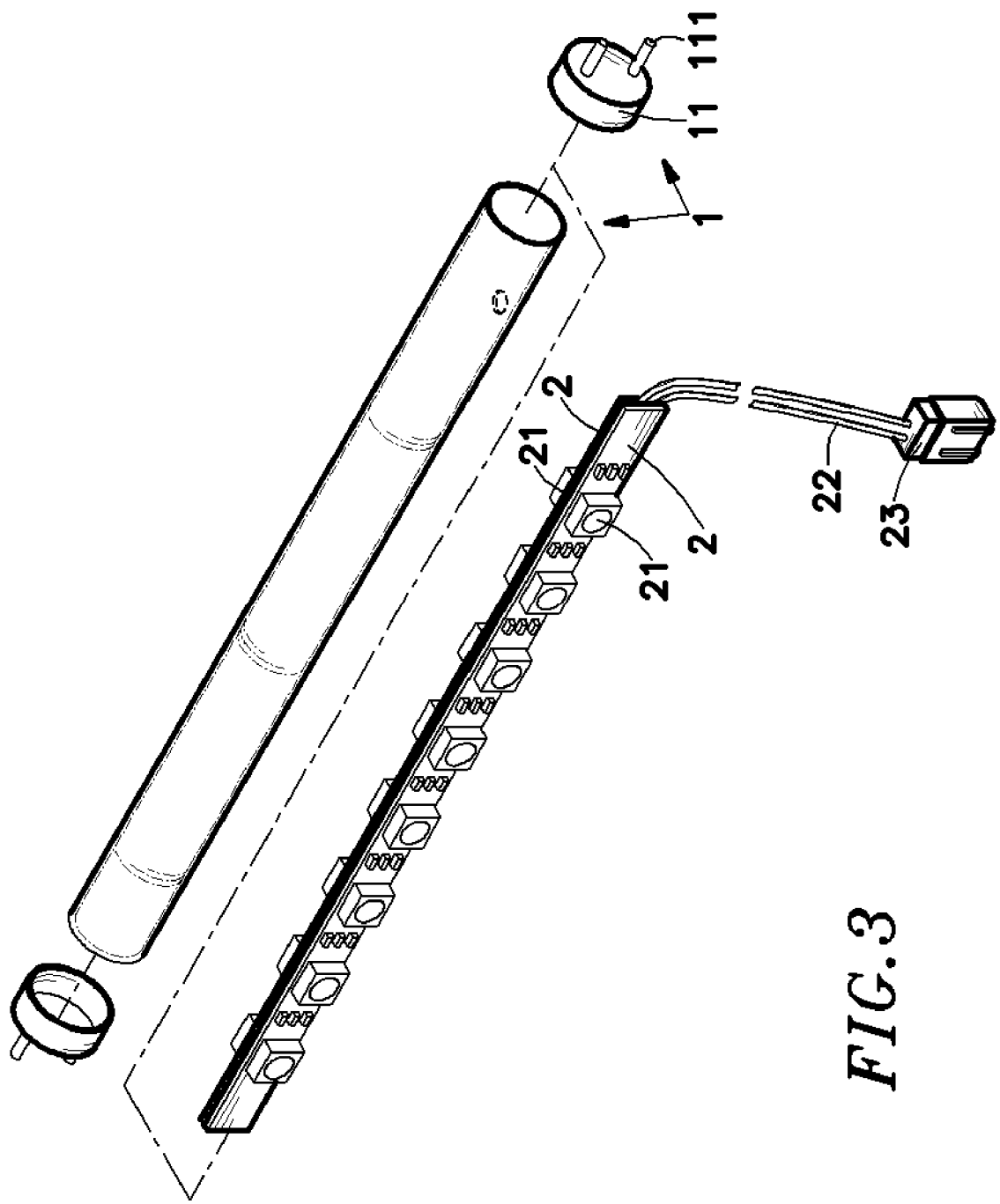
FIG. 3 is an exploded view of an alternate form of the LED lamp tube according to the present invention.

FIG. 3 is an exploded view of an alternate form of the LED lamp tube according to the present invention. According to this embodiment, two circuit boards 2 are attached together back to back, each carrying an array of LEDs 21, and the two circuit boards 2 use one common power cord 22 with an electric plug 23 for connection to power supply.

Figure 4:
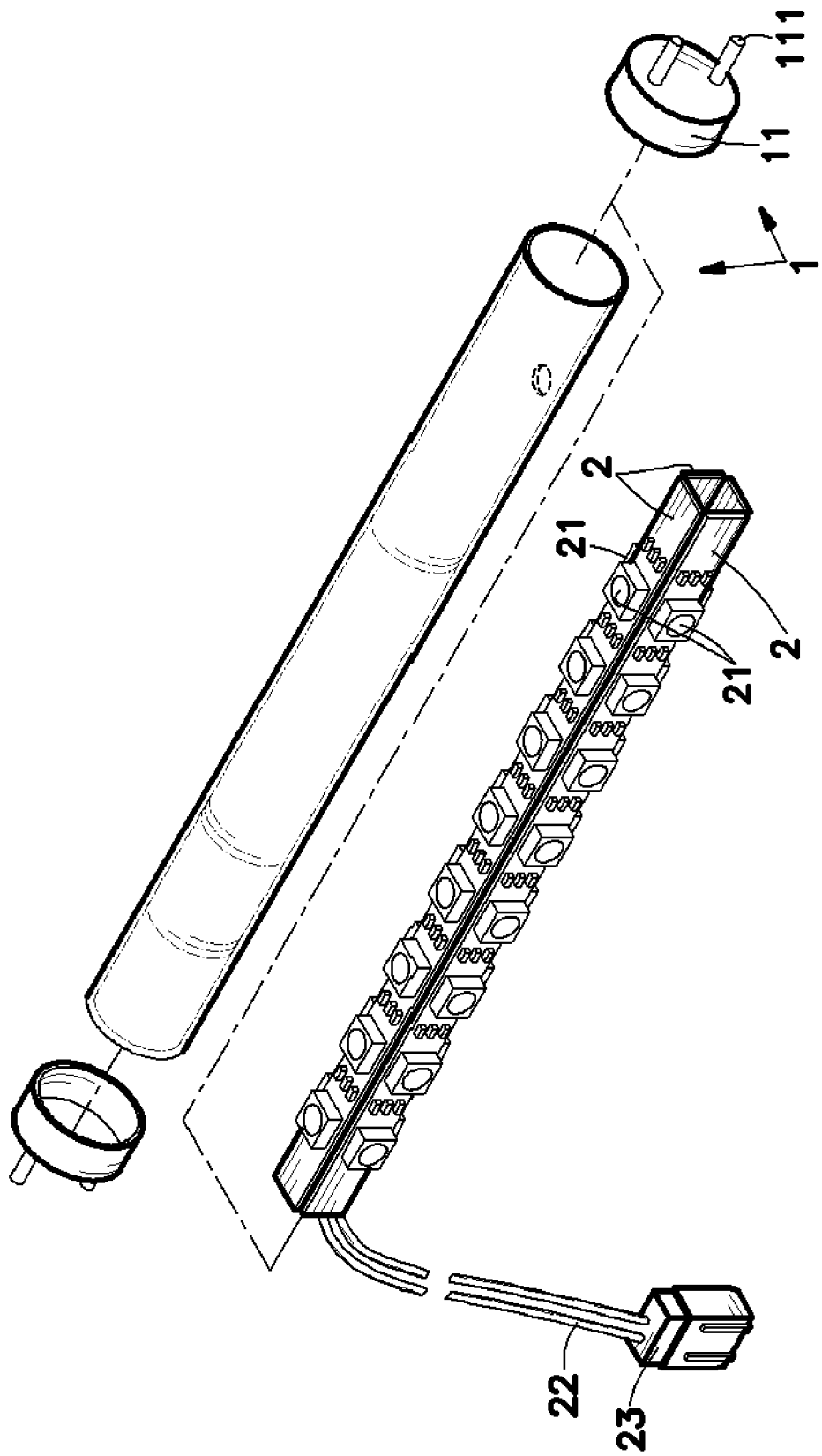
FIG. 4 is an exploded view of another alternate form of the LED lamp tube according to the present invention.

FIG. 4 is an exploded view of another alternate form of the LED lamp tube according to the present invention. According to this embodiment, four circuit boards 2 are arranged at four sides and abutted against one another, forming a rectangular tube, and the four circuit boards 2 use one common power cord 22 with an electric plug 23 for connection to power supply.

Figure 5:
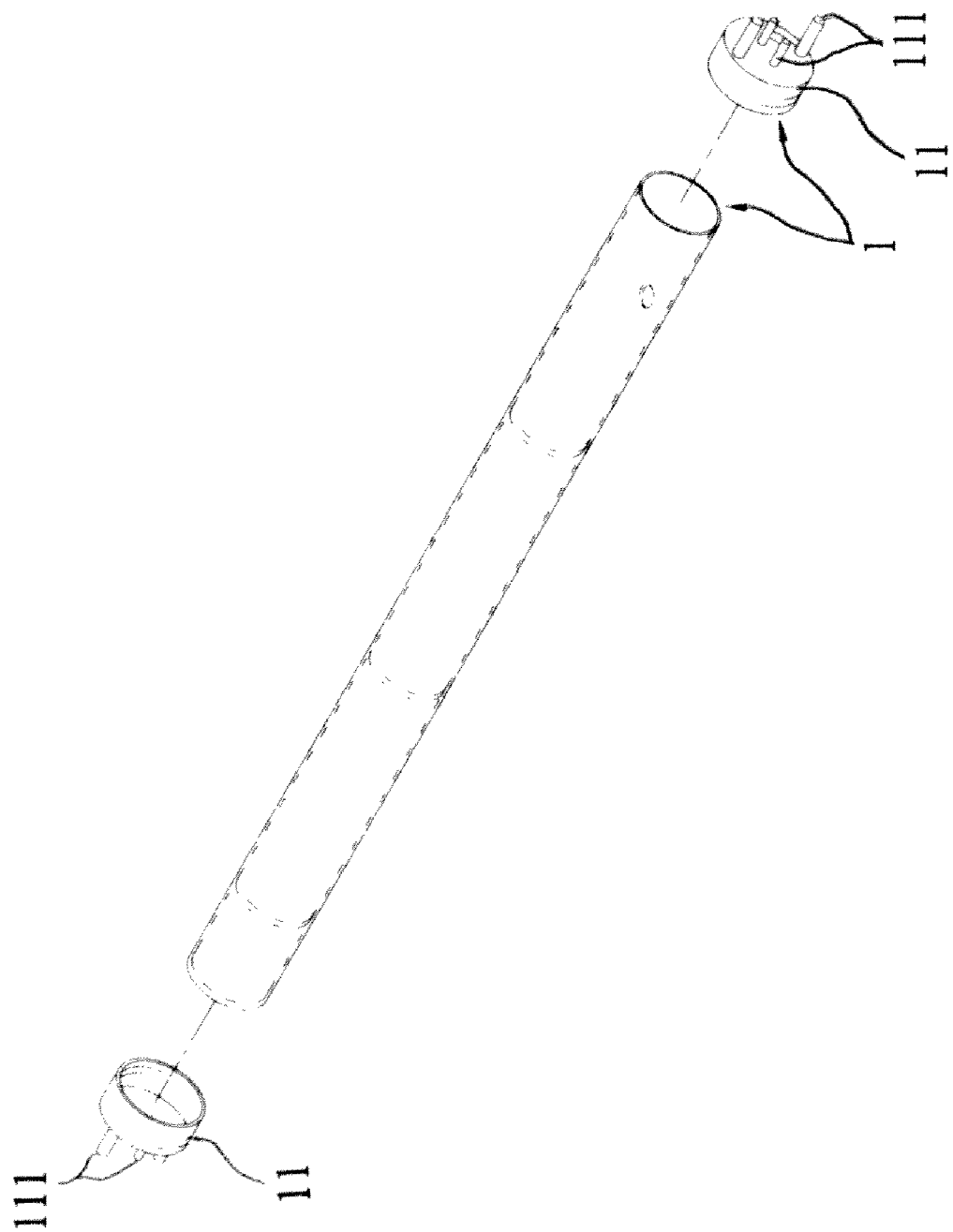
FIG. 5 is an exploded view of still another alternate form of the LED lamp tube according to the present invention.
Figure 6:
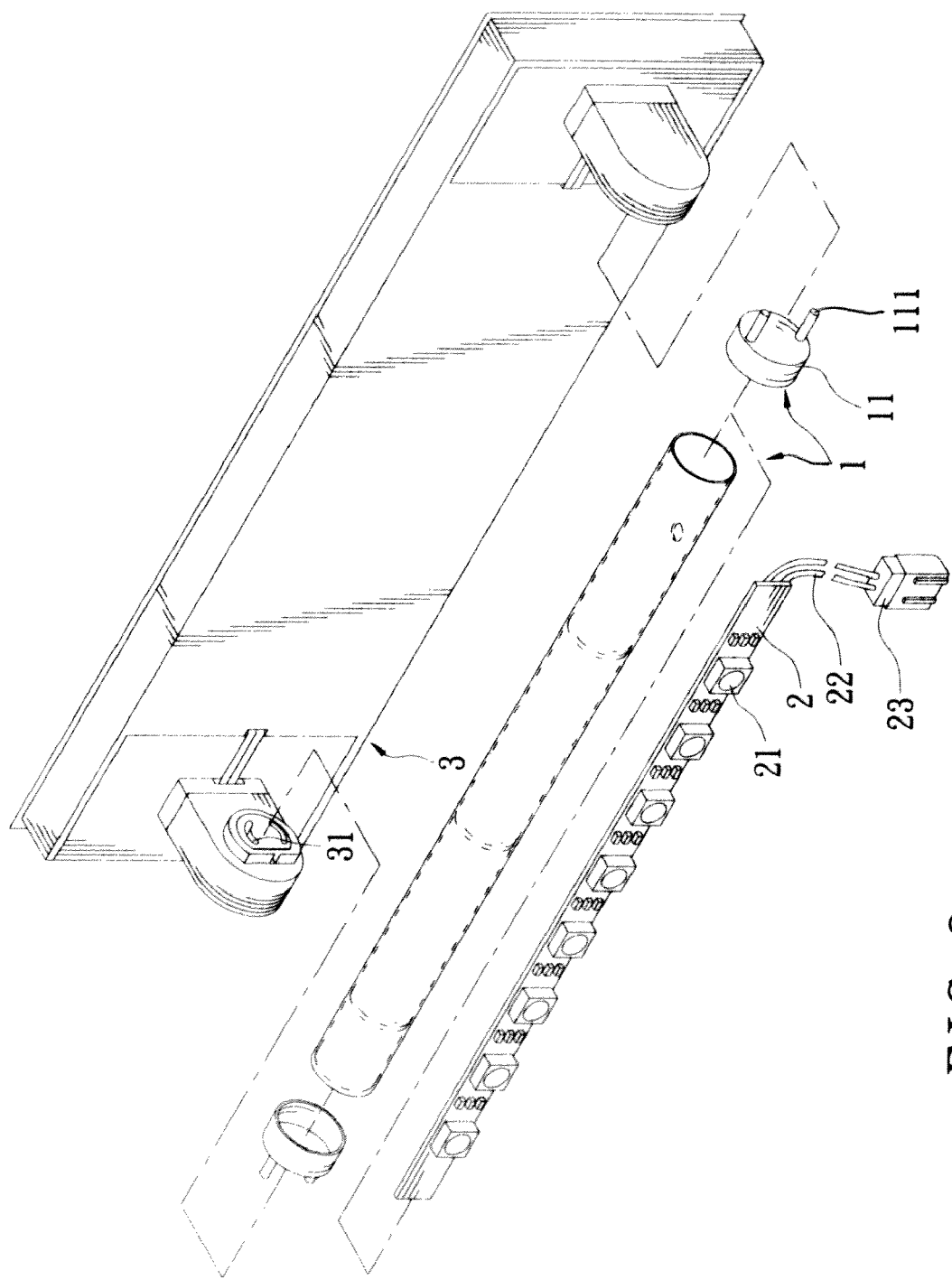
FIG. 6 is an exploded view of the LED lamp tube shown in FIG. 5 with the pair of smaller pins broken off for installation in one type of conventional fluorescent bulb holder.
Figure 7:
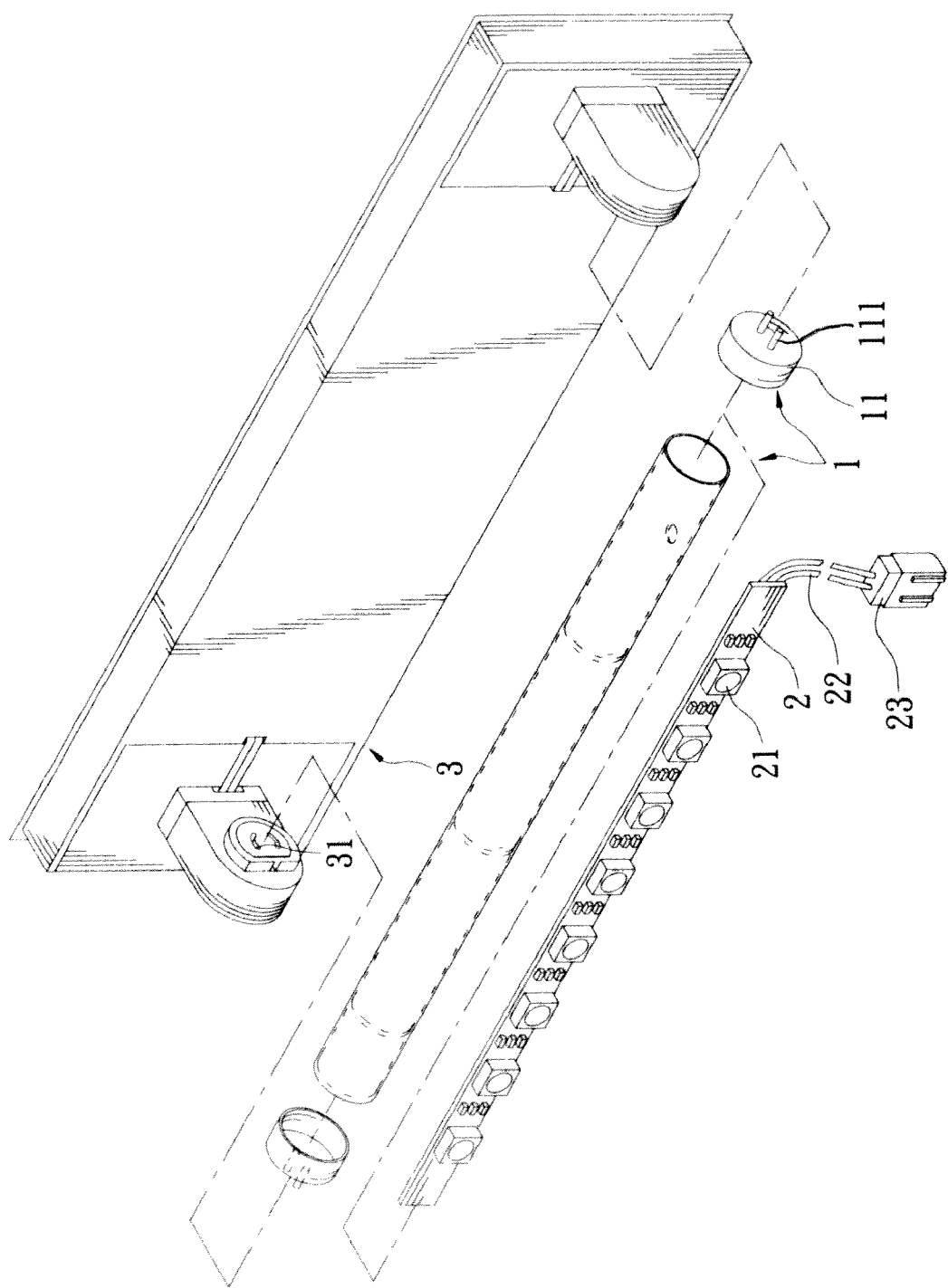
FIG. 7 is an exploded view of the LED lamp tube shown in FIG. 5 with the larger pair of pins broken off for installation in another type of conventional fluorescent bulb holder.

FIG. 5 is an exploded view of still another alternate form of the LED lamp tube according to the present invention. This embodiment is substantially similar to the embodiment shown in FIGS. 1 and 2 with the exception of the pin pattern at the end caps 11, i.e., each end cap 11 of the LED lamp tube according to this embodiment has a set of mounting pins 111 adapted to fit different the connectors 31 of any of a variety of conventional fluorescent bulb holders 3. Before installation, the user can break the unnecessary mounting pins 111 from the end caps 11, as shown in FIGS. 6 and 7, leaving the desired mounting pins 111 subject to the specification of the connectors 31 of the fluorescent bulb holder 3 used.

As indicated above, the invention provides a LED lamp tube, which uses a light penetrable tube to houses at least one circuit board, each circuit board carrying an array of LEDs, and two end caps to secure the light penetrable tube and the housed at least one circuit board to connectors of a convention fluorescent bulb holder, for enabling a power cord of the at least one circuit board to be extended out of the light penetrable tube and connected to power supply to obtain the necessary working voltage for the LEDs at the at least one circuit board. A LED lamp tube made according to the present invention is suitable for use in any of a variety of wall lamps, desk lamps, exhibition lamps, art lamps, projection lamps, car lamps, advertising lights, light signboards, and etc. Because the invention uses LEDs to substitute for conventional fluorescent bulbs, the LED lamp tube has the advantages of quick reaction time, small size, low power consumption, low pollution, high brightness, and long service life.

Although particular embodiments of the invention have been described in detail for purposes of illustration, various modifications and enhancements may be made without departing from the spirit and scope of the invention.

What is claimed is:

1. An LED lamp assembly, comprising:
   a tube, the tube housing at least one circuit board mounted with LEDs;
   a power cord passing through and out of the tube and electrically extending from said at least one circuit board and terminating in an electric plug for connection to a power supply;
   a first end cap, having a cup on a first side rotatably capping a first end of the tube, and a flat non-annular surface on a second side having a first pair of mounting pins and a second pair of mounting pins extending therefrom, the mounting pins being configured to supportively and non-electrically mount the first end cap onto a first socket; and
   second end cap, having a cup on a first side rotatably capping a second end of the tube, and a flat non-annular surface on a second side having a first pair of mounting pins and a second pair of mounting pins extending therefrom, the mounting pins being configured to supportively and non-electrically mount the second end cap onto a second socket;
   wherein the first and second pairs of mounting pins of each of the first and second end caps are respectively adapted for different standard sockets; said first and second pairs of mounting pins being selectively breakable and removable from the first and second end caps, for fitting an unbroken, remaining first and second pair of mounting pins in a suitable standard socket;
   wherein said tube is configured to be freely rotatable relative to said first and second end caps directly, devoid of any displacement of said first and second end caps; said rotation resulting from a force imparted along any portion of the entire length of the tube; said rotation and force independent of location of first and second end caps.

2. The LED lamp assembly as claimed in claim 1, wherein said electric plug is connectable to an AC adapter.

3. The LED lamp assembly as claimed in claim 1, wherein the number of said at least one circuit board is two, and the two circuit boards are back to back.

4. The LED lamp assembly as claimed in claim 1, wherein the number of said at least one circuit board is greater than two and wherein the circuit boards abut against each other.

5. An LED lamp assembly, comprising:
   a tube, the tube housing at least one circuit board mounted with LEDs;
   a first end cap, having a cup on a first side rotatably capping a first end of the tube, and a flat non-annular surface on a second side having a first pair of mounting pins and a second pair of mounting pins extending therefrom, the mounting pins being configured to supportively and non-electrically mount the first end cap onto a first socket; and
   a second end cap, having a cup on a first side rotatably capping a second end of the tube, and a flat non-annular surface on a second side having a first pair of mounting pins and a second pair of mounting pins extending therefrom, the mounting pins being configured to supportively and non-electrically mount the second end cap onto a second socket;
   wherein the first and second pairs of mounting pins of each of the first and second end caps are respectively adapted for different standard sockets; said first and second pairs of mounting pins being selectively breakable and removable from the first and second end caps, for fitting an unbroken, remaining first and second pair of mounting pins in a suitable standard socket;
   wherein said tube is configured to be freely rotatable relative to said first and second end caps directly, devoid of any displacement of said first and second end caps; said rotation resulting from a force imparted along any portion of the entire length of the tube; said rotation and force independent of location of first and second end caps.

* * * * *